June 19, 1951     F. V. ROMIG ET AL     2,557,471

TRAILER HITCH

Filed Jan. 24, 1949

INVENTOR.
FRANK V. ROMIG
DONALD C. TURNER
BY Buckhorn and Cheatham
Attorneys

Patented June 19, 1951

2,557,471

UNITED STATES PATENT OFFICE 2,557,471

TRAILER HITCH

Frank V. Romig and Donald C. Turner, Portland, Oreg.

Application January 24, 1949, Serial No. 72,452

3 Claims. (Cl. 280—33.1)

The present invention has to do with a device for controlling the position of a coupling element such as a hook on a towing vehicle, or of a fifth wheel for a semitrailer, in relation to the towing vehicle frame. In the operation of towing vehicles it is often necessary to move the equipment in reverse in order to make turns in close quarters, to place the equipment in position at docks, platforms and alongside railway cars, and for many other reasons. It is also necessary to attach towing vehicles to trailing vehicles which are stationary and, in many instances, positioned at right angles to the curb in narrow streets. A great deal of skill is required of the operator in carrying out the necessary maneuvers, and even with maximum skill much time is consumed in bringing the cooperating portions of the coupling mechanism on the towing and towed vehicles into registration with each other. An object of the present invention is to provide means for shifting the position of the coupling element from the center of a towing vehicle to either side of the frame of the towing vehicle so as to facilitate the coupling movement.

A further object of the present invention is to provide a device of the character described which may be utilized in connection with the steering gear of a towing vehicle so that movement of the coupling element on the towing vehicle from side to side may be controlled by the steering mechanism so as to provide for accurate tracking of the trailer behind the towing vehicle on roadways with curves of short radii.

The objects and advantages of the present invention may be more readily ascertained by inspection of the following specification taken in connection with the accompanying drawings wherein like numerals refer to like parts throughout, while the features of novelty will be more distinctly pointed out in the appended claims.

Figure 1:
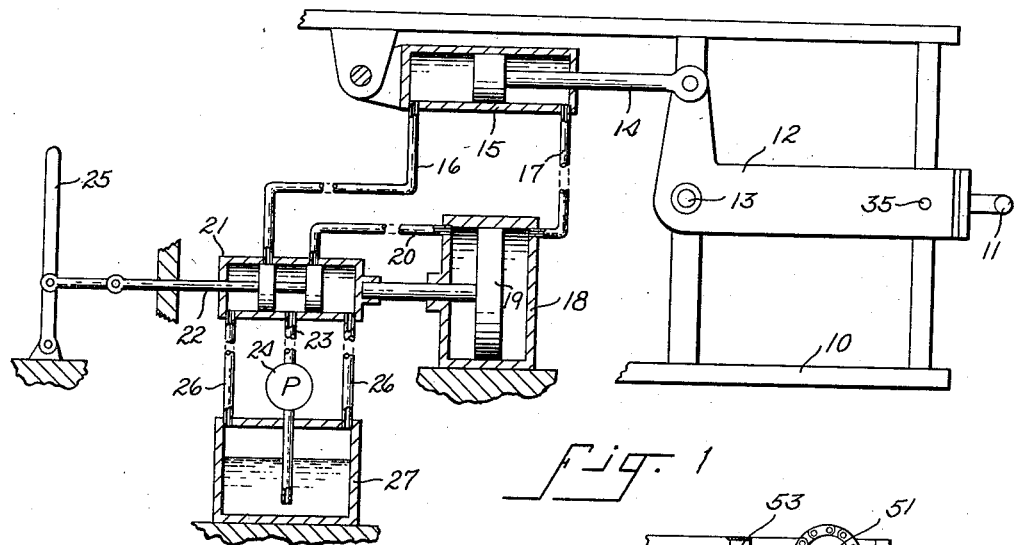
Figure 2:
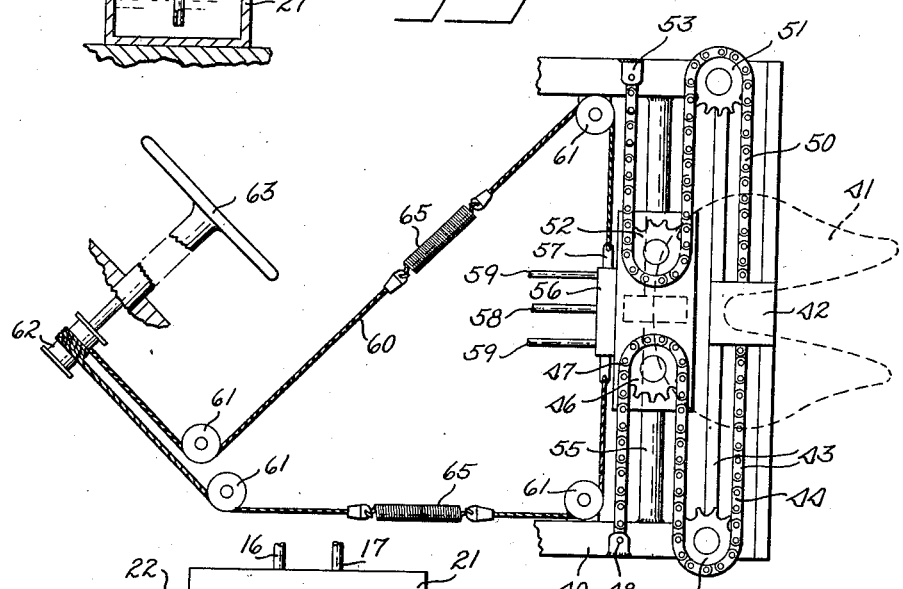
Figure 3:
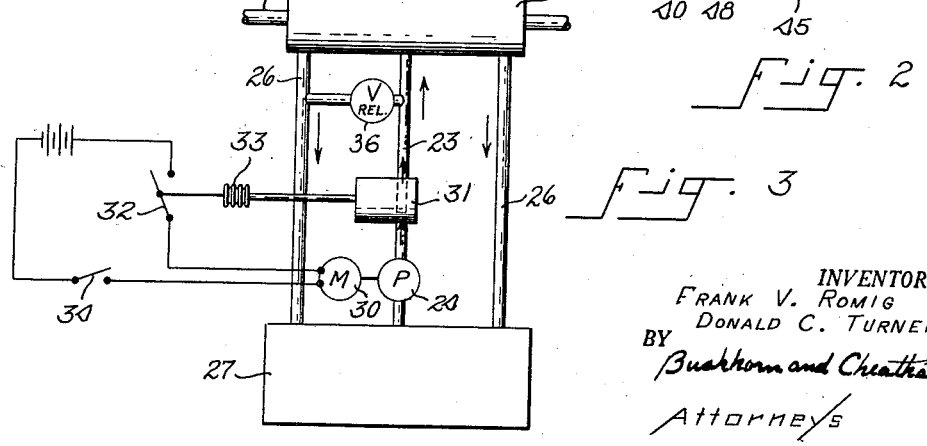

In the drawings Fig. 1 is a schematic representation of one form of mechanism embodying the present invention;

Fig. 2 is a schematic representation of a modified form of the present invention; and Fig. 3 is a schematic representation of a portion of a hydraulic system which may be employed in either form of the invention.

Referring to Fig. 1, there is disclosed a portion 10 of the frame of a towing vehicle. A coupling element 11, such as a hook or ball, projects from the rear of the frame and normally occupies a central position thereon, the coupling element being movable with respect to the frame instead of being rigidly mounted thereon. In order that the coupling element may move transversely of the frame, it is fixed to the end of a long arm of a bell crank 12 pivotally mounted at 13 on the frame, the short end thereof being pivotally connected to an operating piston 14 extending from a pivotally mounted operating cylinder 15. The piston is centrally located when the coupling element is centrally located, and the piston may move in either direction to swing the coupling element from side to side in accordance with the admission or emission of fluid through pipes 16 and 17 connected to the opposite ends of the cylinder. The pipe 17 leads to one end of a master cylinder 18 rigidly connected to the frame and having a piston 19 located therein. The opposite end of the master cylinder is connected by means of a pipe 20 to an intermediate portion of a movable control valve 21, the pipe 16 being connected to a spaced point thereof. The control valve contains a valve stem 22 having spaced enlargements thereon spaced apart sufficiently to block the entrances to pipes 16 and 20 when the valve stem is centered. Intermediate of the two enlargements the control valve is connected to an inlet tube 23 leading from a source of pressure such as a pump 24. If the valve stem 22 is moved in either direction so as to connect one or the other of pipes 16 and 20 with the pump 24, the coupling element will be swung in one or the other direction. If the valve stem is moved toward the left the coupling element is moved by pressure from the pump acting directly against the piston 14. Such movement forces fluid from the cylinder 15 through pipe 17 to move the master piston 19 and the control valve 21 toward the left until the pipe 16 is blocked. If the valve stem is moved toward the right, pipe 20 will be uncovered, thereby causing movement of piston 19 and corresponding movement of piston 14 until the control valve moves sufficiently to the right to block entry of pipe 20. The pressure supplied through inlet tube 23 may be supplied from any suitable source, and the motive fluid may be liquid or gaseous; however, the fluid trapped between the right end of cylinder 15 and the right end of cylinder 18 and movable through pipe 17 should be a noncompressible liquid. Movement of the valve stem 22 may be controlled by a suitable control member such as the pivoted lever 25 which would be under control of the operator of the towing vehicle. Fluid which is returned to either end of the control valve 21 may escape through exhaust pipes 26 which may lead to atmosphere, in the case of using air, or to a storage reservoir 27 from which the pump withdraws its fluid, in the case of using a liquid.

In Fig. 3 the details of a preferred form of a pump control are schematically illustrated. If the pump for supplying fluid were direct-driven from the vehicle motor or other moving part it would be over-worked and soon worn out. Therefore, it is preferred that the pump 24 be driven by a separate motor 30 and should operate only when necessary. In order to control such a motor an accumulator 31 is placed in line between the pump 24 and the control valve 21. When the accumulator has stored liquid under sufficient pressure to operate the coupling-moving mechanism, the switch 32 for controlling the motor 30 would be opened by a pressure-responsive switch such as the bellows 33. As a further means of preventing excessive wear, and also to render the system inoperative when desired, a manual switch 34 may be placed in line with the motor. Such a manual switch 34 is particularly desirable in the event that the operator does not wish the coupling element to be movable, in which case he might lock the bell crank in position by means such as a pin 35 passing through the bell crank and a portion of the frame 10. In order that such a locked position shall not result in excessive pressures being created, and in order to protect the system against excessive pressures due to other causes, a pressure relief valve 36 is preferably placed between the inlet pipe 23 and one of the exhaust pipes 26.

In Fig. 2 we have illustrated a modified form of the invention wherein a tractor having a frame 40 is provided with a fifth wheel 41 indicated in dash line. The fifth wheel is mounted upon a block 42 which is movable laterally upon guides 43. The block 42 is connected at one side to a sprocket chain 44 extending about a sprocket 45 at one side of the frame, then about a sprocket 46 mounted on one end of a movable master cylinder 47, and then anchored to the same side of the frame at 48. The opposite side of the block 42 is connected by a chain 50 passing about a sprocket 51 on the frame, then about a sprocket 52 on the opposite end of master cylinder 47, and then anchored to the frame at 53. The master cylinder is guided upon and movable along a transverse rod 55 having a central piston enlargement thereon, the arrangement of the two connections to the opposite ends of the master cylinder 47 (not shown) being similar to the connection of pipes 16 and 17 to cylinder 15. Rigidly mounted upon the cylinder 47 is a master valve 56 corresponding to the master valve 21 and having a double-ended valve stem 57 extending therethrough corresponding to the valve stem 22. The control valve is supplied with liquid through a pipe 58 corresponding to pipe 23, and exhaust therefrom is achieved through pipes 59 corresponding to pipes 26. The opposite ends of the valve stem 57 are connected to the ends of a control cable 60 passing about suitable guide pulleys 61 and a capstan 62 connected to the steering wheel 63. The arrangement is such that when the steering wheel is turned to steer the vehicle toward the right the valve stem 57 is pulled toward the left, thus causing the cylinder 47 to move toward the right and the block 42 toward the left. As soon as the cylinder has moved sufficiently to center the master valve 56, movement will cease, but as long as the steering wheel is turning the movement will continue; thus, the operation of steering causes the coupling element to be moved in the direction opposite to the direction of turning so that the trailing vehicle may track correctly or so that the coupling element may be shifted laterally to facilitate coupling. The control mechanism schematically outlined in Fig. 3 would be associated with this form of the device as well so that the shifting mechanism may be rendered inoperative when desired. A further safety feature may be supplied in the provision of springs 65 in the opposed stretches of the control cable 60 to prevent damage in the event that the steering wheel 63 is turned to a great extent when the coupling element remains centered with respect to the vehicle.

Having illustrated and described preferred embodiments of the invention, it should be apparent to those skilled in the art that the invention permits of modification in arrangement and detail. We claim as our invention all such modifications as come within the true spirit and scope of the appended claims.

We claim:

1. In a vehicle adapted for towing purposes and including a member adapted to couple a towed vehicle thereto, the improvement in means for shifting said coupling member laterally of the towing vehicle comprising a fluid motor operatively connected to the coupling member, said fluid motor comprising two relatively movable parts, one of which may be moved in either direction to shift the coupling member in either direction, a fluid valve operatively associated with said fluid motor and comprising two relatively movable members, both of which are movable with respect to the vehicle, said valve being of the self-following type capable of directing fluid in opposite directions to and from said fluid motor, a manually controllable element accessible to the driver of the towing vehicle and operatively connected to one of said valve members for shifting it relative to the other of said valve members and thereby cause flow of fluid to said fluid motor in one direction, and means operatively connected to said fluid motor for causing the other of said valve members to follow the first moved valve member until the valve members arrive at a relative position in which flow of fluid therethrough is prevented, whereby the position of said coupling member with respect to the vehicle will correspond to the relative position of said manually controllable member.

2. In a vehicle adapted for towing purposes and including a member adapted to couple a towed vehicle thereto, the improvement in means for shifting said coupling member laterally of the towing vehicle comprising a fixed master cylinder and a relatively movable master piston therein, a control valve comprising a movable housing and a relatively movable control piston therein for controlling the direction of fluid flow to and from said master cylinder, said control valve being of the type which is closed when the control piston is at a neutral position with respect to the housing and is opened to cause flow in one direction when the control piston is shifted toward one end of the housing and in the opposite direction when the control piston is shifted toward the other end of the housing, means linking said housing to said master piston, a manually controlled element accessible to the driver of the towing vehicle, and means linking said element to said control piston, whereby movement of said element in either direction causes corresponding movement of said coupling member in a corresponding direction to an extent determined by the extent of movement of said element.

3. In a vehicle adapted for towing purposes and including a member adapted to couple a towed vehicle thereto, the improvement in means for shifting said coupling member laterally of the towing vehicle comprising a fixed master cylinder, a master piston movable in opposite directions within said master cylinder depending upon the direction of flow of a fluid thereinto and therefrom, a control valve comprising a movable housing and a control piston therein for controlling the direction of fluid flow to and from said master cylinder, said control valve being of the type which is closed when the control piston is at a neutral position with respect to the housing and is opened to cause flow in one direction when the control piston is shifted toward one end of the housing and in the opposite direction when the control piston is shifted toward the other end of the housing, means linking said housing to said master piston for coextensive movement therewith, a manually movable element accessible to the driver of the towing vehicle, and means linking said control piston to said element for coextensive movement therewith, whereby movement of said element in either direction causes corresponding movement of said coupling member in a corresponding direction to an extent determined by the extent of movement of said element.

FRANK V. ROMIG.
DONALD C. TURNER.

REFERENCES CITED

The following references are of record in the file of this patent:

UNITED STATES PATENTS

| Number | Name | Date |
| --- | --- | --- |
| 1,908,095 | York et al. | May 9, 1933 |
| 1,962,423 | Brown | June 12, 1934 |
| 2,105,473 | Dean | Jan. 18, 1938 |
| 2,267,656 | Jeffrey | Dec. 23, 1941 |
| 2,429,185 | Hukill | Oct. 14, 1947 |